March 3, 1942.  W. C. STARKEY  2,274,873
CLUTCH CONSTRUCTION
Filed Nov. 27, 1940
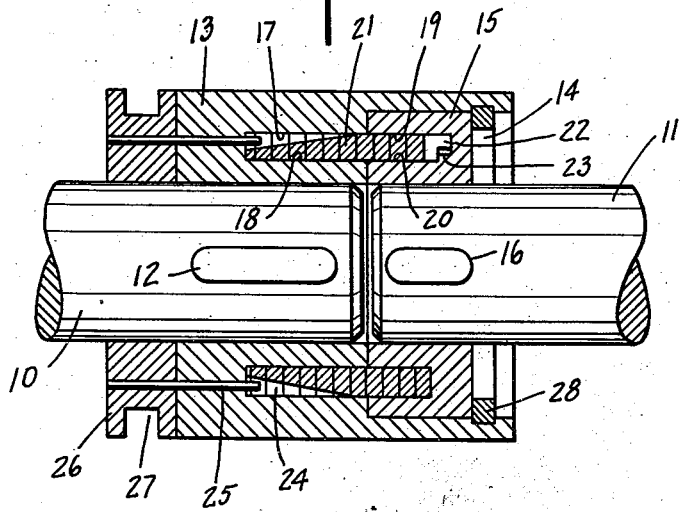
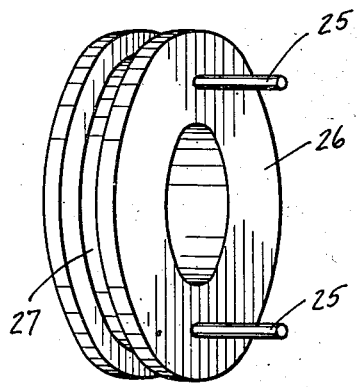 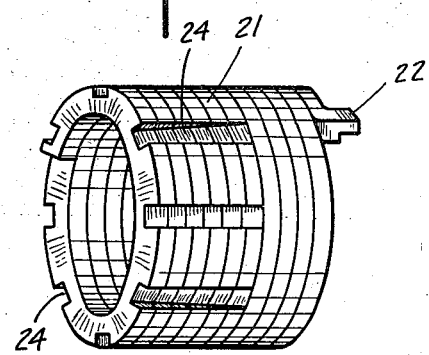
INVENTOR.
WILLIAM CARLETON STARKEY.
BY Lockwood, Goldsmith & Galt,
ATTORNEYS.

Patented Mar. 3, 1942

2,274,873

UNITED STATES PATENT OFFICE 2,274,873

CLUTCH CONSTRUCTION

William Carleton Starkey, Indianapolis, Ind., assignor to L. G. S. Spring Clutches, Incorporated, Indianapolis, Ind., a corporation Application November 27, 1940, Serial No. 367,425

5 Claims. (Cl. 192—37)

This invention relates to a clutch construction of the general type in which a helically wound clutch spring is frictionally engaged with a cylindrical clutch surface for the transmission of power. This application is a continuation-in-part of copending application, Serial No. 285,536, filed July 20, 1939. This type of clutch mechanism has heretofore been used principally for over-running clutches in which power is transmitted in one direction only and in which free relative movement of the driving and driven elements in the opposite direction is desired.

One object of the present invention is to provide a clutch construction of this general type in which power may be transmitted in either direction and in which the driving and driven elements are completely interchangeable.

Another object of the invention is to provide simplified mechanism for controlling the clutching and de-clutching in a construction of this type.

These objects are accomplished by the use of a single clutch spring which is expanded to engage an internal clutch surface for driving in one direction and which is contracted to engage an external clutch surface for driving in the other direction together with a relatively simple means of applying the necessary actuating force to give the spring its initial expansion or contraction.

Other objects and features of the invention will be understood from the accompanying drawing and the following description and claims:

Fig. 1 is a central sectional view through a clutch construction built in accordance with the invention. Fig. 2 is a perspective view of a preferred form of clutch spring used therein. Fig. 3 is a perspective view of an actuator used with the construction of Fig. 1.

In the preferred form of the invention shown in the drawing by way of illustration, there are provided a pair of coaxial shafts 10 and 11, either of which may be a driven shaft and the other a driving shaft. The shaft 10 has secured thereto by a key 12 a clutch member 13 which is provided with a bore 14 in which there is rotatably seated a clutch member 15 secured to shaft 11 by a key 16. The clutch member 13 is provided with a cylindrical counterbore having an internal clutch surface 17 and an external clutch surface 18, both of which surfaces are concentric with the axes of the shafts 10 and 11. The clutch member 15 has a similar counterbore having an internal surface 19 and an external suface 20. A helically wound clutch spring 21, best seen in Fig. 2, is seated in the counterbores and the internal and external diameters of the clutch spring are such that when unstressed it may turn freely in both counterbores. However, one end of the spring 21 is provided with a foot 22 engaging a suitable recess 23 in the clutch member 15 and preventing relative rotational movement of said spring with reference to said clutch member. The opposite end of the spring 21 is normally free.

A plurality of grooves 24 are cut in the outer surface of the free end of the spring 21 and may be engaged by actuator pins 25 secured to a collar 26 which may be either freely mounted on the shaft 10 or splined thereto. Said grooves serve the purpose of increasing the flexibility of the coils at the free end of the spring in addition to their function in receiving the actuator pins 25. The pins 25 are slidably guided in suitable openings in the clutch member 13 or may fit loosely in such openings if collar 26 is splined, and may be moved to engage and disengage the slots 24 as the collar 26 is moved to the right or left on the shaft 10. Said collar is provided with a groove 27 which may be engaged by any suitable form of clutch shifting finger or yoke such as is commonly used in the operation of clutches of various types. A snap ring 28 set in a suitable groove within the bore 14 of the clutch member 13 serves to retain the parts in their normal relation.

In the operation of the apparatus either shaft 10 or 11 may be the driving shaft. Assuming that shaft 10 is the driving shaft, then the driving clutch member 13 moves freely with respect to the spring 21 as long as the collar 26 is held sufficiently far to the left to prevent engagement of the actuator pins 25 with the slots 24. When the collar 26 is shifted to the right, however, the pins 25 may enter oppositely positioned slots 24 and since said pins are rotating with the driving clutch member 13 while the spring is stationary, the pins exert a force on the spring which tends to expand or contract the same, depending on the direction of rotation of the driving shaft 10.

If the rotation of the shaft 10 is clockwise as viewed from the right of Fig. 1, the force of the pins 25 tends to wrap the spring 21 tightly around the clutch surfaces 18 and 20. The frictional engagement of the spring with these clutch surfaces starts rotation of the driven clutch member 15 and tends to wrap the spring more tightly around the clutch surfaces. Thus only a very small actuating force is necessarily applied through the actuator pins 25 to provide a positive clutching action. If the rotation of the driving shaft 10 is in the counter-clockwise direction when viewed from the right, the force exerted by the actuator pins 25 on the spring 21 tends to expand the same into engagement with the internal clutch surfaces 17 and 19. The frictional engagement of the spring with said surfaces tends to expand the same still further and to clutch said spring tightly to said surfaces. Thus the force exerted by the pins 25 causes the spring 21 to frictionally engage either one or the other of the clutch surfaces and to transmit the rotating force of the driving clutch member 13 to the driven clutch member 15 in either direction.

When the shaft 11 is the driving shaft, the spring 21 rotates freely in the counterbore of the stationary driven clutch member 13 until engaged by the actuator pins 25, whereupon the spring is expanded or contracted as before to clutch together the driving member 15 and driven member 13.

From the foregoing specification it is apparent that the invention provides a clutch construction in which the driving force may be applied in either direction and in which either of the two rotating elements may be the driving or the driven member. The actuating force for all of these types of action is applied through a single simple mechanism, the movement of which is always in the same direction irrespective of the type of action employed.

The invention has been described in one of its preferred forms, the details of which may be varied without departing from the scope of the invention as defined by the appended claims. For example, the use of the longitudinal grooves 24 receiving the actuator pins 25 has important advantages in a clutch which is to be driven in one direction only, since the plurality of grooves provides a number of points at which the pins 25 may engage and thus reduce the lost motion in the engagement of the clutch. In the use of the invention for a clutch spring to be expanded only or to be contracted only, the construction is the same as shown in the drawing. For an expanding clutch, however, it is not necessary that the clutch surface 18 be provided and for a contracting clutch the surface 17 may be omitted.

The invention claimed is:

1. In a clutch construction, a first rotatable member having an external and an internal cylindrical clutch surface, said surfaces being coaxial with the rotation of said member and spaced apart, a second rotatable member coaxial with the first, one of said members being a driving member and the other a driven member, a helical clutch spring arranged between said clutch surfaces and having one end anchored to said second rotatable member and the other end free, the unstressed diameter of said spring being such that said spring may run freely between said clutch surfaces, and the free end of said spring having a plurality of longitudinally directed slots formed in a surface thereof, and an actuator mounted for rotation with said first rotatable member and movable with respect thereto to be engaged in one or more of said slots and disengaged therefrom, said actuator when so engaged exerting an expanding force on the free end of said spring when relative movement of said members is in one direction and a contracting force when said movement is in the opposite direction, whereby said spring is expanded to clutch said internal surface or contracted to clutch said external surface.

2. In a clutch construction, a first rotatable member having an external and an internal cylindrical clutch surface, said surfaces being coaxial with the rotation of said member and spaced apart, a second rotatable member coaxial with the first, one of said members being a driving member and the other a driven member, a helical clutch spring arranged between said clutch surfaces and having one end anchored to said second rotatable member and the other end free, the unstressed diameter of said spring being such that said spring may run freely between said clutch surfaces, and the free end of said spring having a plurality of longitudinally directed slots formed in a surface thereof, an actuator collar associated with said first rotatable member and constrained to rotate therewith but axially movable with respect thereto, and an actuator carried by said collar and movable in the axial movement thereof to be engaged in one or more of said slots and disengaged therefrom, said actuator when so engaged exerting an expanding force on the free end of said spring when relative movement of said members is in one direction and a contracting force when said movement is in the opposite direction, whereby said spring is expanded to clutch said internal surface or contracted to clutch said external surface.

3. In a clutch construction, a first rotatable member having an external cylindrical clutch surface coaxial with the axis of rotation of said member, a second rotatable member coaxial with the first, one of said members being a driving member and the other a driven member, a helical clutch spring having one end anchored to said second rotatable member and the other end free and surrounding said external clutch surface, the unstressed diameter of said spring being such that said spring may run freely around said clutch surface, the free end of said spring having a plurality of longitudinally directed slots formed in a surface thereof, and an actuator mounted for rotation with said first rotatable member and movable with respect thereto to be engaged in one or more of said slots and disengaged therefrom, the direction of relative movement between said rotatable members when the clutch is disengaged being such that said actuator when so engaged exerts a contracting force on the free end of said spring whereby said spring is contracted to clutch said external clutch surface.

4. In a clutch construction, a first rotatable member having an internal cylindrical clutch surface coaxial with the axis of rotation of said member, a second rotatable member coaxial with the first, one of said members being a driving member and the other a driven member, a helical clutch spring having one end anchored to said second rotatable member and the other end free and extending within said internal clutch surface, the unstressed diameter of said spring being such that said spring may run freely within said clutch surface, the free end of said spring having a plurality of longitudinally directed slots formed in a surface thereof, and an actuator mounted for rotation with said first rotatable member and movable with respect thereto to be engaged in one or more of said slots and disengaged therefrom, the direction of relative movement between said rotatable members when the clutch is disengaged being such that said actuator when so engaged exerts an expanding force on the free end of said spring whereby said spring is expanded to clutch said internal clutch surface.

5. In a clutch construction, a first rotatable member having a cylindrical clutch surface coaxial with the axis of rotation of said member, a second rotatable member coaxial with the first, one of said members being a driven member and the other a driving member, a helical clutch spring having one end anchored to said second rotatable member and the other end free and provided with a clutch surface adapted to mate with said first mentioned clutch surface, the unstressed diameter of said spring being such that said clutch surfaces are normally disengaged and the free end of said spring having a plurality of longitudinally directed slots formed in a surface thereof, and an actuator mounted for rotation with said first rotatable member and movable with respect thereto to be engaged in one or more of said slots and disengaged therefrom, relative movement between said rotatable members causing said actuator when so engaged to exert a torsional force on the free end of said spring whereby the diameter of said spring is changed sufficiently to bring said clutch surfaces into clutching engagement.

WILLIAM CARLETON STARKEY.